United States Patent [19]
Denz et al.

[11] Patent Number: 4,623,974
[45] Date of Patent: Nov. 18, 1986

[54] METHOD AND APPARATUS FOR SELF-MONITORING OF MICROCOMPUTER-CONTROLLED NETWORK DEVICES IN PARTICULAR IN MOTOR VEHICLES

[75] Inventors: Helmut Denz, Stuttgart; Peter Etzold, Baltmannsweiler; Wolfgang Gröschel; Günther Kaiser, both of Stuttgart; Heinz Kraemer, Wernau; Werner Nitschke, Ditzingen; Martin Zechnall, Schwieberdingen, all of Fed. Rep. of Germany

[73] Assignee: Robert Bosch GmbH, Stuttgart, Fed. Rep. of Germany

[21] Appl. No.: 824,935
[22] PCT Filed: Jul. 15, 1982
[86] PCT No.: PCT/DE82/00149
 § 371 Date: Aug. 24, 1983
 § 102(e) Date: Aug. 24, 1983
[87] PCT Pub. No.: WO83/02836
 PCT Pub. Date: Aug. 18, 1983

Related U.S. Application Data

[63] Continuation of Ser. No. 530,573, Aug. 24, 1983, abandoned.

[30] Foreign Application Priority Data

Feb. 5, 1982 [DE] Fed. Rep. of Germany ....... 3204003
May 26, 1982 [DE] Fed. Rep. of Germany ....... 3219650

[51] Int. Cl.⁴ .............................................. G06F 15/20
[52] U.S. Cl. .................................... 364/551; 73/117.3; 364/431.01; 324/379

[58] Field of Search .................. 364/550, 551, 431.01, 364/431.03; 73/116, 117.2, 117.3; 324/378–380, 384, 402

[56] References Cited

U.S. PATENT DOCUMENTS

| 3,630,076 | 12/1971 | Staudt | 73/117.3 |
| 3,792,445 | 2/1974 | Bucks et al. | 73/117.3 |
| 3,964,302 | 6/1976 | Gordon et al. | 73/117.3 |
| 4,317,364 | 3/1982 | Asano et al. | 73/117.3 |
| 4,398,258 | 8/1983 | Naitoh et al. | 364/551 |
| 4,418,388 | 11/1983 | Allgor et al. | 364/431.01 |
| 4,476,531 | 10/1984 | Marino et al. | 324/379 |
| 4,521,885 | 6/1985 | Melocik et al. | 364/551 |
| 4,551,801 | 11/1985 | Sokol | 364/551 |

Primary Examiner—Parshotam S. Lall
Attorney, Agent, or Firm—Frishauf, Holtz, Goodman & Woodward

[57] ABSTRACT

A method is proposed for self-monitoring of microcomputer-controlled network devices (10) in motor vehicles which in accordance with applied transducer signals execute specified functions and upon detecting an error store a corresponding data word in memory. For indicating the error, the data word is converted into a signal train or voltage and detected by means of voltage measurement. This is preferably accomplished by inserting a diagnosis insert-plug (42) between the transducer lines and the network device (10). A voltmeter (47) can be connected to this test adapter and indicates this signal train or voltage. A specific type of error is associated with a specific voltage. As a result, a diagnosis which is as detailed as desired, of a complicated system, can be performed with a simple voltmeter (47) available in commerce.

23 Claims, 7 Drawing Figures

METHOD AND APPARATUS FOR SELF-MONITORING OF MICROCOMPUTER-CONTROLLED NETWORK DEVICES IN PARTICULAR IN MOTOR VEHICLES

This application is a continuation of application Ser. No. 530,573, filed Aug. 24, 1983, now abandoned.

The present invention relates to a method for self-monitoring of microprocessor-controlled automotive systems, and to an apparatus for performing the method.

BACKGROUND

Self-diagnosis devices for microcomputer-controlled network devices are already known, for instance from German Patent Disclosure Documents Nos. DE-OS 28 24 190, (and corresponding U.S. Pat. No. 4,267,569) DE-OS 29 22 371, and DE-OS 31 21 645. In these known systems, once an error is detected a corresponding data word is stored in a memory of the network device itself, and it can then be read and evaluated, for instance by a testing mechanic, in a repair facility using additional devices. To this end, a complicated serial interface is required, which many microcomputer systems do not initially have, and/or complicated additional devices are needed for performing the evaluation. These devices, in turn, must usually include a microcomputer. With each new network device, such systems must be altered and adapted accordingly, which is expensive.

SUMMARY OF THE INVENTION

Briefly, the method of the invention is to convert a data word indicative of a program error or of a signal line fault into an electrical signal and to detect that signal. The method and the corresponding apparatus have the advantage over the prior art that the diagnosis can be performed with a conventional, commercially available voltmeter. Practically no additional hardware is required in the network device itself, with the possible exception of a larger memory. The rate at which network devices are needlessly replaced may be expected to drop substantially, because the testing mechanic is highly unlikely to conclude that a network device error exists if the network device responds correctly during self-diagnosis.

Expanding the ROM or RAM capacity of the network device may not be at all necessary under some conditions, because often the existing memory locations are not all occupied during normal functioning.

By means of the provisions recited in the dependent claims, advantageous further developments of and improvements to the method disclosed in the main claim are possible. It is particularly advantageous if during normal operation only a short diagnosis program is provided, while a full diagnosis is then performed when the motor vehicle or its drive assembly is stopped, should an error not be detected by this short diagnosis program.

It is furthermore particularly advantageous to issue the ALTER command for performing the full diagnosis or for triggering the error signal train for the voltmeter via a switch, in particular a switch provided in the diagnosis insert-plug. The ALTER command is executed by the short-circuiting of at least one inut of the network device, preferably the engine speed transducer input. A high level of reliability is thereby attained, because upon calling up the diagnosis program the vital speed transducer signal is short-circuited, and its absence causes the drive assembly to come to a stop in any event. This reliability can be still further increased by providing that a specific combination of input signals be short-circuited. If neither the short diagnosis nor the full diagnosis detects any error, then a program for monitoring electrical devices controlled by the network device, in particular network output stages and positioning element, is advantageously started. This program then generates specific signal trains, in accordance with the actuation of specific transducers, to an associated output of the network device, for instance to an associated device which is to be controlled.

If the switch in the diagnosis insert-plug is actuated in order to call up the diagnosis signal train or the full diagnosis, then a control lamp output, intended as an indicator of a stored error data word, is advantageously connected to an output in the diagnosis insert-plug, to which a voltmeter can also be connected. Naturally, it is also possible for this voltmeter to be integrated with the diagnosis insert-plug itself. In a particularly advantageous manner, a diagnosis insert-plug of this kind can also be provided for a multiplicity of different network devices, in that by standardizing the corresponding inputs which are to be short-circuited, a uniform diagnosis command can be generated.

DRAWING

Two exemplary embodiments of the invention are shown in the drawing and are explained in detail in the ensuing description. Shown are:

FIG. 1, one exemplary embodiment having a diagnosis insert-plug and a network device;

FIG. 2, a flow chart explaining the function of the network device for the ignition of an internal combustion engine during normal operation;

FIG. 3, a flow chart explaining the mode of operation of the emission of a test signal train and of full diagnosis when the normal function of the network device is shut OFF;

FIG. 4, a flow chart explaining the monitoring of electrical devices controlled by the network device which is performed upon the absence of an error data word;

FIG. 5, a second exemplary embodiment without a diagnosis insert-plug;

FIG. 6, a flow chart explaining the function; and

FIG. 7, a flow chart explaining an example of a condition dictating that diagnosis be performed.

DESCRIPTION OF THE EXEMPLARY EMBODIMENT

Figure 1:
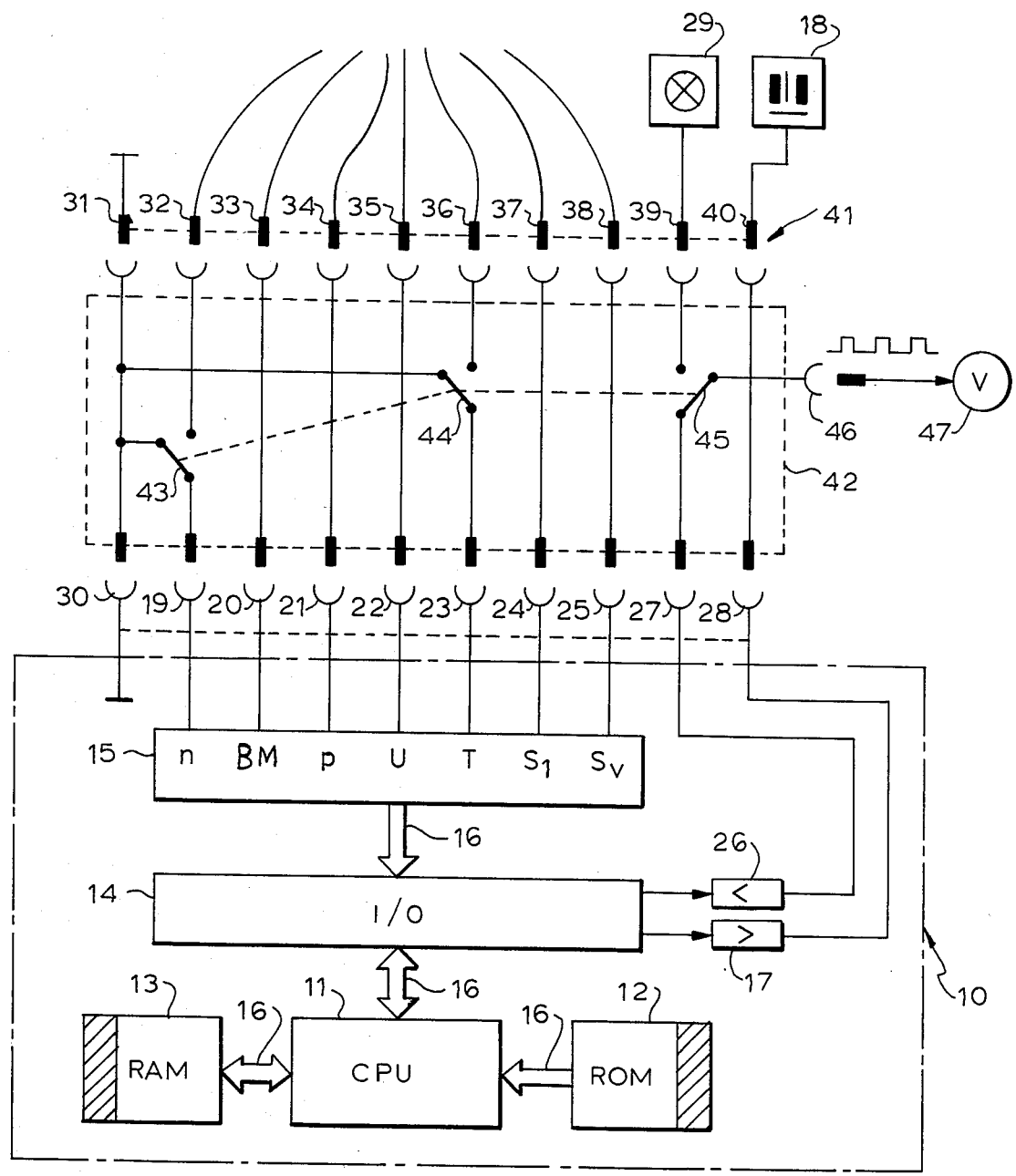

In the exemplary embodiment shown in FIG. 1, a network device 10 for controlling the ignition of an internal combustion engine is shown, the network device in a known manner comprising a microcomputer 11 (CPU), a fixed data memory 12 (ROM), a working memory 13 (RAM), an input/output (I/O) circuit 14, and a signal shaping circuit 15, which are interconnected via bus lines 16. The signal shaping circuit 15 also includes apparatus for disturbance suppression and for the digitization of input variables. An ignition coil 18 is controlled by the input/output circuit 14 via an ignition output stage 17. Transducer signals in accordance with which the ignition function is supposed to be performed are applied to the signal shaping circuit 15. These transducer signals are dependent on the engine speed n, the reference mark BM, the (ambient and/or intake-tube) pressure p, the supply voltage U, the (ambient and/or engine) temperature T, the position of the idling switch $S_1$ and the position of the full-load switch $S_v$. Naturally any desired number of further parameters can be delivered to this signal shaping circuit 15. The delivery is effected via terminals 19-25. This kind of network device 10 having a microcomputer is known both from the prior art listed at the outset herein and from the prior art addressed in those documents. The controlling of the ignition process represents merely one of many possibilities. Further examples of what can be monitored and controlled by network devices of this kind are fuel injection, transmission control, anti-skid wheel function, operating data functions and so forth. The principle is applicable even beyond such functions, to any other microcomputer system outside the field of automotive technology (for instance, to washing machines, controls for elevators or lifts, machine tools and so forth).

A further output of the input/output circuit 14 is connected via a further switching stage 26 to a terminal 27. A terminal 39 is connected to a control lamp 29. A further terminal 30 is connected to ground. The shaded areas of the two memories 12, 13 represent those memory locations which suffice to satisfy the additional amount of memory needed for the diagnosis. As already mentioned at the outset, an expansion of the memory of this kind is often unnecessary, because the existing memory locations for the normal functions are not all used. Furthermore this is associated with a minimal additional expense in terms of hardware.

During normal operation, the terminals 30, 19-25, 27, 28 are connected with the plug contacts 31-40 of a multiple plug 41 to a cable harness. The plug contacts 32-38 are connected with the corresponding transducers. The plug contacts 39, 40 are connected to the control lamp 29 and the ignition coil 18, respectively, and the plug contact 31 is connected to ground. For the diagnosis, the multiple plug 41 is disconnected and a diagnosis insert-plug 42 is inserted. This diagnosis insert-plug 42 connects the terminals 30, 19-25, 27, 18 with the plug contacts 31-40. The connections between the terminals 19, 23, 27 and the plug contacts 32, 36, 39 can be broken by means of switches 43, 44, 45. In the second switching position (diagnosis position), the terminals 19 and 23 are connected via the terminal 30 to ground, while the terminal 27 is connected to an output terminal 46 of the diagnosis insert-plug 42. A voltage measuring device 47 (voltmeter) can be connected to this output terminal 46. Naturally, this voltmeter 47 may instead be connected solidly to the diagnosis insert-plug 42 or integrated with it. The engine speed meter which is built into the vehicle and is triggered by the ignition system can also be used for the purpose of error indication.

The mode of operation of the exemplary embodiment shown in FIG. 1 will now be described, referring to the method steps shown in FIGS. 2-4 (flow charts). Programming the network device 10 or the memory 12 appropriately is within the competence of anyone skilled in this art and is accomplished using the programming instructions for the particular microcomputer type used, as found in the manuals or documentation issued by the microcomputer manufacturer. Naturally the method according to the invention could also be performed in principle by hardware means.

Figure 2:
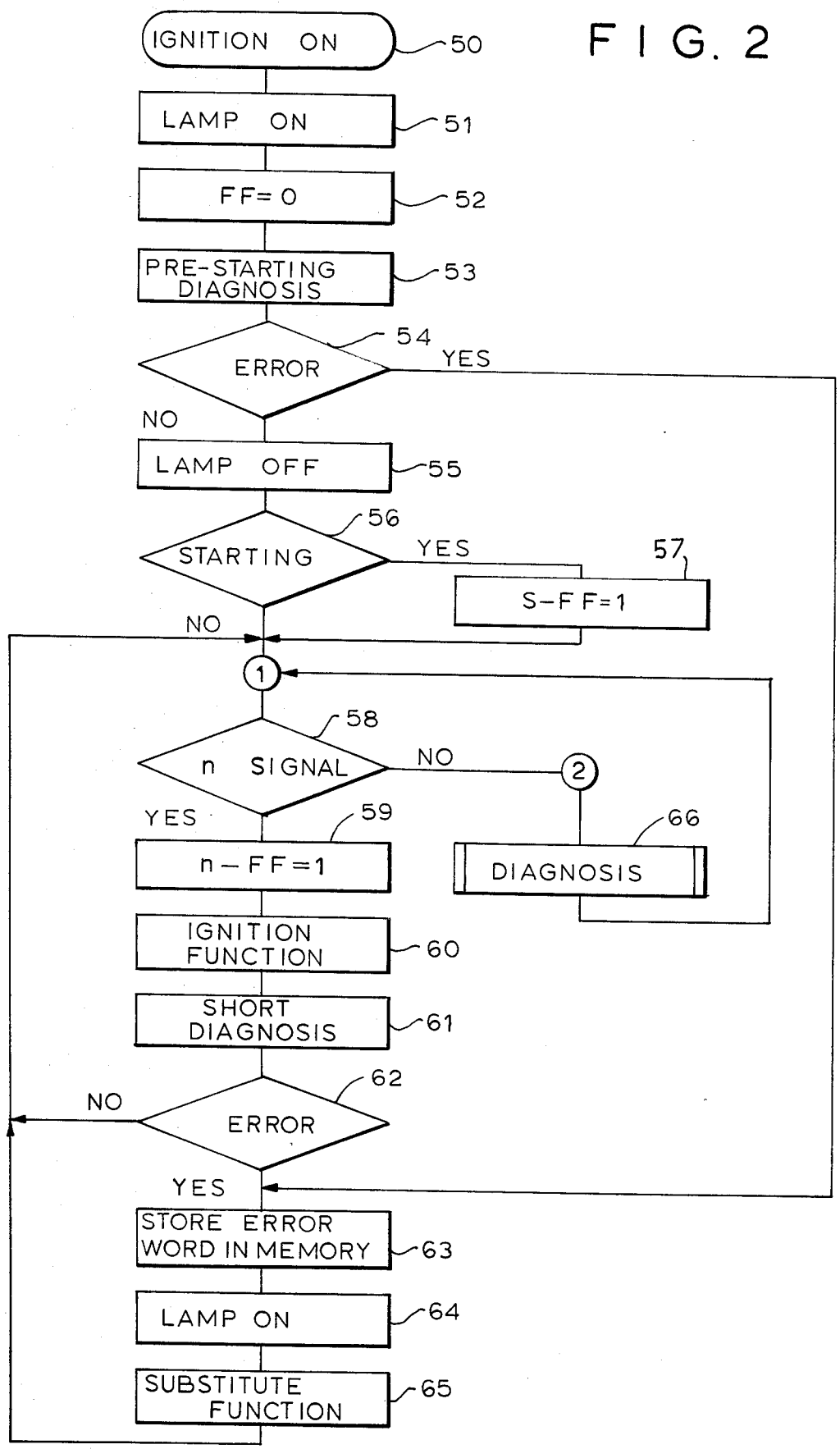

According to FIG. 2, first the ignition is switched ON (50), which is usually done by connecting the network device 10 with a source of supply voltage. Then, via the switching stage 26, a control signal is applied to the control lamp 29. At this moment, the multiple plug 41 is still directly connected to the terminals 30, 19-25, 27, 28; that is, the diagnosis insert-plug 42 has not yet been inserted between them. The control lamp 29 is switched ON (51). This action is effected solely for the purpose of monitoring the control lamp 29 itself. Then, all the flip-flops which are contained in the microcomputer (in the microprocessor 11 or in the input/output circuit 14) are set to zero (52). The purpose of this is to specify a definite initial status. A pre-starting diagnosis is then effected (53), which takes place with the drive assembly stopped, or in other words with the associated internal combustion engine not operating. In this step, transducer or other lines may for example be monitored for short-circuiting, or elements carrying a voltage can be monitored for whether the appropriate voltage is being carried. Such self-diagnosis processes are known from the prior art discussed initially herein. It is thereby decided whether an error is present (54). Should this not be the case, then the control lamp goes out (55). Next, an attempt is made to start the engine (56). If the engine does start, then a starting flip-flop (S-FF) is set to the value 1 (57). The next step is one of monitoring whether an engine speed signal (n signal) is present (58). Let it be assumed for the moment that this is the case, as a result of which an engine speed flip-flop (n-FF) is set to the value of 1 (59). Subsequently the microcomputer generates the actual ignition function itself (60), in order to produce ignition sparks in the ignition output stage 18. This is prior art which has often been described and it has been reduced to practice, for instance in BMW vehicles (Motronic). A short diagnosis is thereupon performed (61); that is, only the most essential functions are monitored, so as not to require too much computation time, which would reduce the computation time available for the ignition function. If no error is ascertained (62) by the short diagnosis (61), then a program loop back to the program step (58) is made. In this program loop, regular operation takes place for the generation of ignition events.

If an error is ascertained (54 or 62), then an error word specific for this error is stored in the working memory 13 (63). The control lamp 29 is switched ON (64), as a result of which an indication is provided to the driver than an error exists and that he must seek out a repair facility. A switchover is then made—as needed—to a substitute or auxiliary function (65). The switchover of a computer, or individual components thereof, to a substitute function is known, for instance from German Patent Disclosure Documents Nos. DE-OS 2 838 619 or DE-OS 30 08 232. A loop back to the program step (58) is then made.

With the control lamp 29 ON, the driver then looks for a repair facility. There, the diagnosis insert-plug 42 is inserted between the network device 10 and the transducer lines. As a result of the shutoff, the stored error data word in the working memory is generally lost, unless a nonvolatile memory was used. Since the transducer lines at first are still connected via the diagnosis insert-plug 42 with the network device 10, starting and subsequent operation takes place again as shown in FIG. 2. Since the error will once again occur, even if only after a relatively long period in operation, the control lamp will again light up (64) because of this error, and the appropriate error data word will be stored. With the engine in operation, a switchover is now made to diagnosis operation, by switching the switches 43–45 over into the position shown in FIG. 1. Since the engine speed signal n which is absolutely necessary for engine operation is now connected to ground, the engine will stop.

Figure 3:
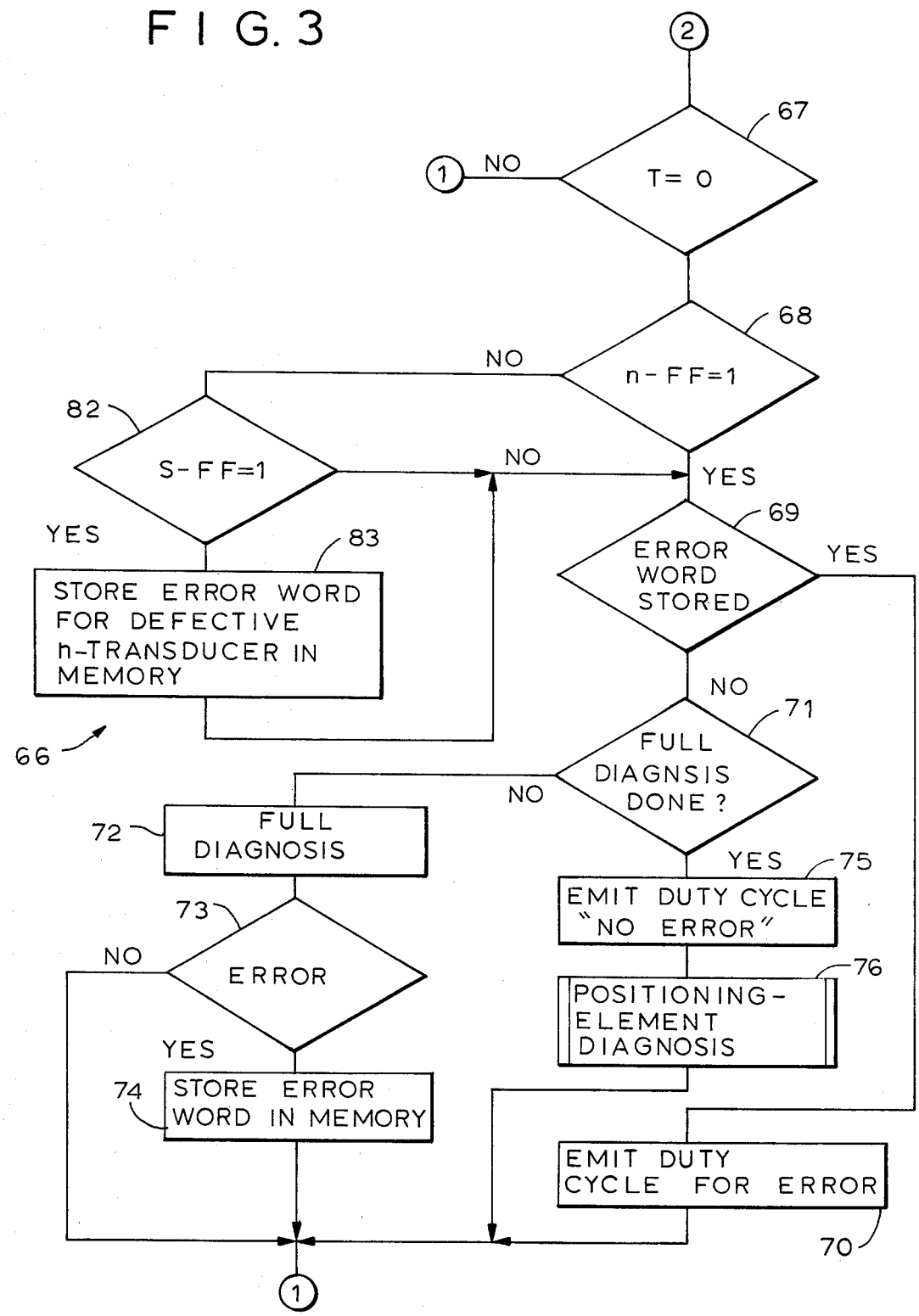

From program step 58, the diagnosis program (66) is now called up, because of the missing engine speed signal; the method steps of the diagnosis program are shown in detail in FIG. 3. First monitoring is performed as to whether the terminal 23, at which the temperature signal is generally present, is likewise connected to ground (67). Should this not be the case, then a direct return to program step (58) is made, as a result of which a waiting loop is produced, until the terminal 23 is likewise connected to ground. If both terminals 19, 23 are now connected to ground, this is the characteristic indicating that the diagnosis program should be run. In principle, of course, any desired inputs or combinations thereof can be connected to ground or to a predetermined signal level in order to initiate the diagnosis program. Monitoring is now performed as to whether the engine speed flip-flop contains the value of 1 (68); that is, whether prior to the switchover to diagnostic operation an engine speed signal was present. This would have to be the case for normal operation. An inquiry is thereupon made whether an error data word is stored in memory (69). Since the control lamp 29 has responded, this would have to be the case. The computer now generates an output signal train for the voltmeter 47, the duty cycle (TV) of which has a predetermined association with the stored error data word (70). Naturally an analog voltage signal could be used instead of a signal train of this kind, having been formed with the aid of a digital-to-analog converter. The voltmeter 47 will show an indicator deflection to a predetermined value which is characteristic for the type of error that has been stored. The various possible errors can thus be associated with various voltages, referring to tables.

A return is then made to the program step (58), and the described loop is traveled until such time as the error indication has shut off.

If an error now occurs during operation, for instance, without the control lamp 29 lighting up, then an error exists which either has not been or cannot be recognized by the short diagnosis (61). In program step (69), it is accordingly ascertained that no error data word is stored in memory. An inquiry is thereupon made whether a full diagnosis has already taken place (71). Since in this stage such will not be the case, this full diagnosis is now performed (72). The full diagnosis can be very detailed, because there is no longer any restriction as to the length of the program and an operating program (ignition program) no longer has to be taken in consideration. Depending now upon whether an error is detected or not (73), a corresponding error data word is stored in memory (74) and a return is made to the program step (58). During the subsequent running of the diagnosis program, the course is via the program step (69) to the program step (70), and an error signal train is delivered to the voltmeter 47 if an error has been detected. If no error was detected, that is, if no error data word was stored in memory (69), then it is thereupon ascertained that a full diagnosis has already taken place (71). The voltmeter 47 is thereupon supplied with a signal train which causes an indicator deflection, characterizing the detection of no error (75). A switchover then takes place to the positioning-elements diagnosis program (76) shown in further detail in FIG. 4. Naturally, this can also be dispensed with in a simple form of embodiment.

A special case does still exist if the engine speed flip-flop contained the value 0 (68), that is, if no engine speed signal at all had previously appeared. Monitoring is then performed as to whether the starting flip-flop is set, that is, whether starting has taken place (82). Should this not be the case, a return is made to the regular diagnosis program. If this is the case, however, then the engine speed transducer must be defective, since starting without an engine speed signal is not possible. A corresponding error word is stored (83) and a return is made to the regular diagnosis program.

Figure 4:
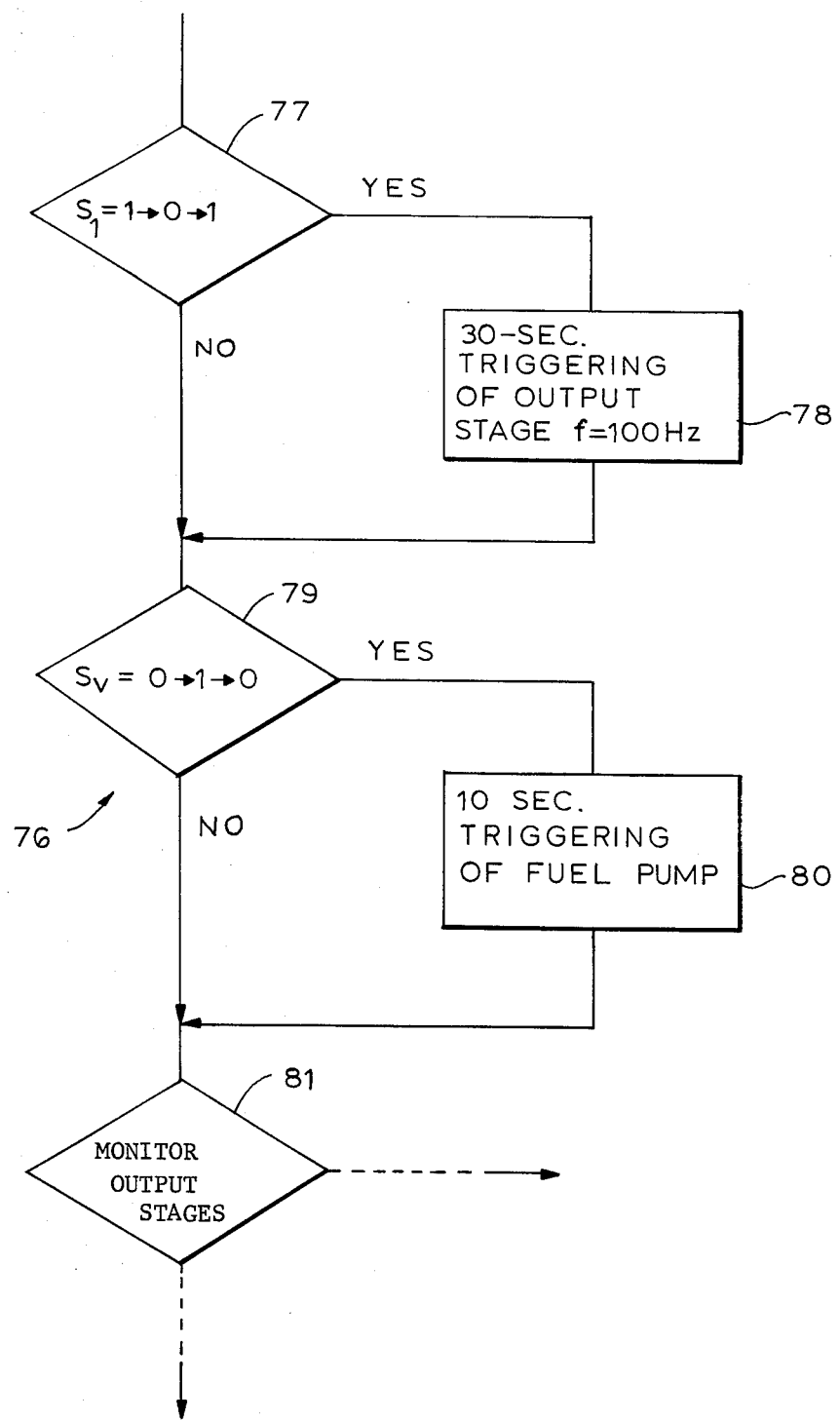

The method for positioning-element diagnosis shown in FIG. 4 becomes effective only if an error has not been detected by either the pre-starting diagnosis (53) nor the short diagnosis (61) nor the full diagnosis (72). The probability is then high that the error can only be in a positioning element, the term "positioning element" being understood to include all the electrical devices controlled by the network device, and in particular network output stages and engine-driven assemblies.

An inquiry is first made as to whether the idling switch $S_1$ is generating the signal train of 1-0-1 (79). If this is the case, that is, if the testing mechanic is actuating the idling switch accordingly, then a fixed signal train will be applied by the network device 10 to the ignition output stage 18, for example. This signal train may for example be a 100-Hz signal of 30 seconds' duration, with a definite closure time (for instance, 3 msec) (78). Naturally the voltmeter 47 now no longer suffices for the diagnosis; instead, this signal has to be monitored with appropriate measuring instruments. A next sensor is then actuated—in the illustrated case, the full-load switch $S_v$, which is to be actuated by the testing mechanic in the sequence of 0-1-0 (79). If this is recognized by the positioning-element diagnosis program (79), then the fuel pump is triggered for a duration of 10 seconds (80). No measuring apparatus is required for monitoring this, because the running fuel pump is audible, and the duration can be estimated or determined using a clock. In this manner, further output stages are monitored in sequence, which the generalized program step (81) is intended to indicate. What is important here is that upon each actuation of an input or of a transducer in a specific, predetermined manner, a specific, predetermined output signal to an apparatus to be controlled is generated. The testing mechanic can find what is to be actuated and what the sequence should be from tables. The positioning-element diagnosis program (76) is now run in program loops until such time as an input signal of this type is generated in the specified manner.

The positioning-element diagnosis program (76) shown in FIG. 4 serves to monitor devices to be controlled, but the functioning of which the network device 10 is not capable of monitoring by direct inquiry. Naturally these devices can also be monitored in the course of the full diagnosis, by providing appropriate feedback loops from the devices to be controlled to the network device 10. As a result of these feedback loops, an additional expense would of course be necessary for cable connections, as would additional inputs in the network device 10.

It must be remembered that the monitoring of the devices to be controlled which is performed with the aid of the positioning-element diagnosis program (76)

can also be effected by the voltmeter 47, if appropriate output signal trains are generated for the particular devices upon the prescribed actuation of transducers. To accomplish this, a switchover of the corresponding output of the network device 10 to the voltmeter 47 would have to be provided for by means of reversing switches.

Figure 5:
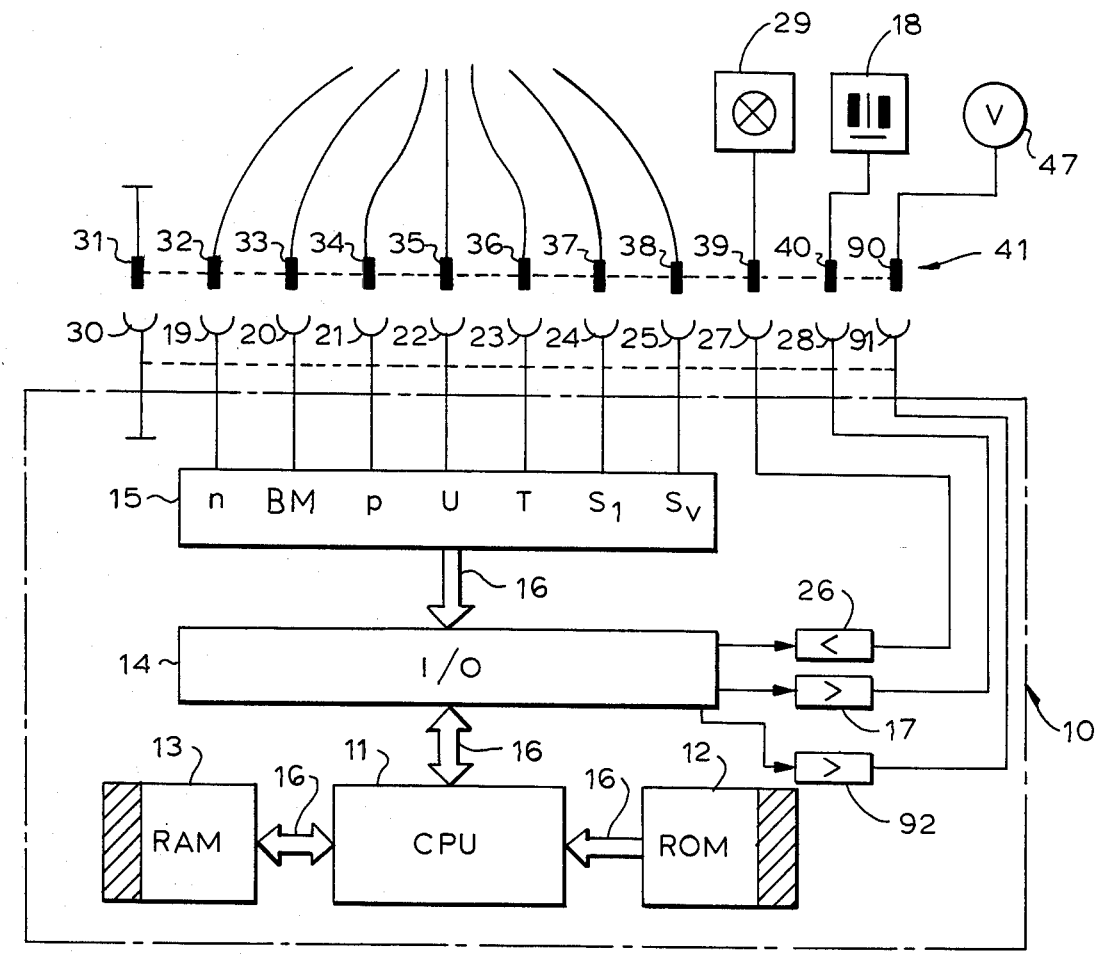

The second exemplary embodiment shown in FIG. 5 corresponds for the most part to the first exemplary embodiment shown in FIG. 1, but the insert-plug 42 is omitted. Identical reference numerals refer to identical components and will not be described again. The multiple plug 41 has an additional plug contact 90, with which an additional terminal 91 is associated. The input/output circuit 41 is connected via an additional amplifier stage 92 with the terminal 91. The plug contact 41 is connected to the voltage measuring device 47, which in this exemplary embodiment is built in and is preferably the engine speed meter of the motor vehicle. Naturally, instead of a voltage measuring device, a device for measuring current is within the scope of the invention. Such a device would accordingly have to be controlled by a source of electric current, which is controllable either via a signal train having a duty cycle corresponding to the error data word or via some other voltage signal.

The operation of the exemplary embodiment shown in FIG. 5 will now be explained, referring to the flow chart shown in FIG. 5. The essential concept of the second exemplary embodiment is that an insert-plug is not required for diagnosis, and the multiple plug 41 does not need to be removed. It remains plugged in during the diagnosis. After the ignition is switched ON, the method steps 50–55 are first run as in the first exemplary embodiment. Subsequently, with the engine still shut off, an inquiry is made as to a condition for diagnosis (93), which is explained in further detail in FIG. 7 and is substantially based on the requirement that a specific signal train of the idling switch $S_1$ and of the full-load switch $S_v$ must be generated. If this condition for diagnosis is satisfied, then a diagnosis flip-flop (D-FF) is set to the value of 1 (94). The engine is then started (95). Should starting occur during the testing of the condition for diagnosis—that is, if the condition for diagnosis should not yet have been performed completely—then the remaining portion of the condition for diagnosis is skipped, in particular by means of an interrupt signal. The diagnosis flip-flop is in this case of course not set. After starting, the regular ignition function (60) is performed. Monitoring is then performed as to whether the diagnosis program should be run. This is accomplished by an inquiry as to the condition of whether with the engine now running both the idling switch $S_1$ and the full-load switch $S_v$ are actuated. This combination of signals can never occur during normal engine operation. It is produced, for example, if with the engine idling ($S_1=1$) the testing mechanic actuates the full-load switch $S_v$ in the engine compartment; this switch may, for example, be located on the shaft of the throttle valve of the carburetor. If the condition for switchover to diagnosis (96) is thus satisfied, then monitoring is performed as to whether the diagnosis flip-flop is set (97). If this too is the case, then a switchover to diagnosis (66) is made, as shown in detail in FIG. 3. Entry into the program is however now made at position 3, because the functions 67, 68, 82, 83 are no longer required for this exemplary embodiment. After diagnosis has been completed, a return is made to the start; that is, the engine can be started again whenever desired. If one of the conditions 96 or 97 is not satisfied, then the function course shown in FIG. 2 is run, with the short diagnosis 61 and the functional courses which follow it.

Figure 6:
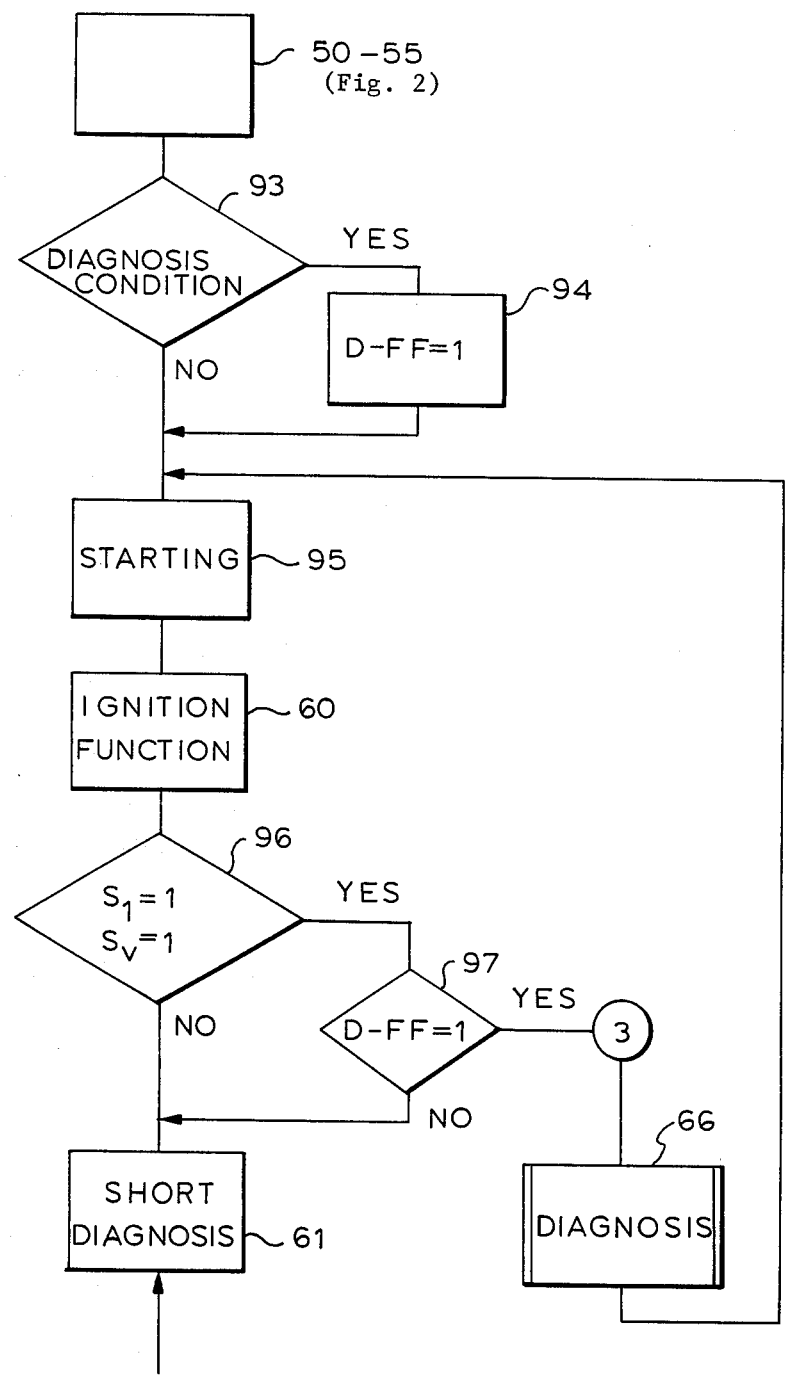
Figure 7:
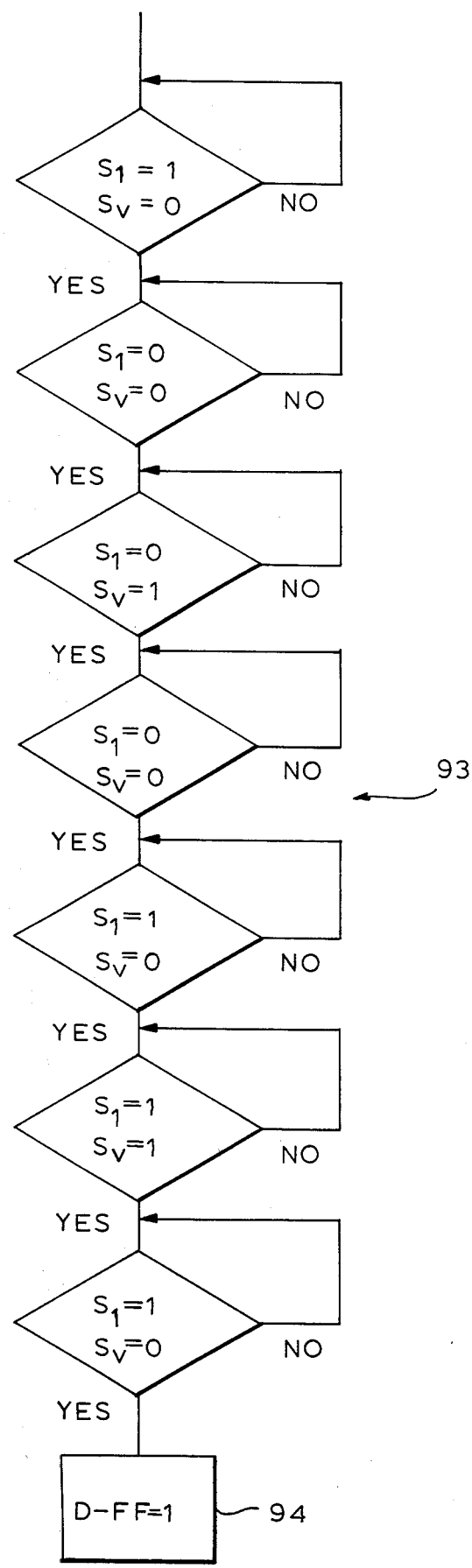

The condition for diagnosis (93) which is specified when the vehicle is stopped is shown in detail in FIG. 7. It is specified in that a predetermined sequence of switching combinations of the two switches $S_1$ and $S_v$ is generated. First, the accelerator pedal is in the idling position ($S_1=1$ and $S_v=0$). Then the driver actuates the accelerator pedal ($S_1=0$ and $S_v=0$) as far as the end stop ($S_1=0$ and $S_v=1$). Then he releases the pedal once again ($S_1=0$ and $S_v=0$) until it returns to the original position ($S_1=1$ and $S_v=0$). Subsequently the full-load switch is actuated in the engine compartment as well ($S_1=1$ and $S_v=1$), a condition which never occurs in normal operation. After the release of the full-load switch $S_v$, the former condition is once again attained ($S_1=1$ and $S_v=0$). If these actuations have taken place in the correct sequence, then the diagnosis flip-flop is set (94) in the manner described above. Once this condition for diagnosis is established, the vehicle is started according to FIG. 6 and a test drive is made. On this test drive, the previously detected error word should be memorized once again. Upon returning to the repair facility, and with the engine running, the switching condition of $S_1=1$ and $S_v=1$ is again established in the engine compartment (96). The automatic diagnosis then takes place (66). In order to assure that the condition $S_1=1$ and $S_v=1$ will not be generated during the test drive as a consequence of an error of brief duration, causing the vehicle to switch unintentionally over to diagnostic operation and thus to stop, the condition 96 can be designed such that the actuation of the full-load switch $S_v$ has to be maintained until such time as the engine comes to a stop. Only then may the switch $S_v$ be released. As a result, errors of brief duration during the drive no longer have any effect.

It must be noted that the condition for switching ON the diagnostic operation may also take place in any other desired sequence. Furthermore, such a condition can also, in a simpler form of embodiment, be specified only when the engine is running or only when the engine is stopped. Also, the diagnostic conditions 93 and 96 can be transposed, for instance. Finally, other combinations of transducer signals can also be utilized for generating the diagnosis command. The two switches $S_v$ and $S_1$ have the advantage then that they are easily actuatable and the appropriate combination of ALTER commands is thus easily generated.

It should also be mentioned that the inquiry of the switching sequence 93 and/or the emission of the error code via the voltage or current measuring device 47 existing in the vehicle can of course also take place while the engine is running, that is, during normal functioning of the control device 10, should the program load of the computer or realtime problems permit. The advantage of the embodiment described above, however, is that the smallest possible additional load is put on the normal control device function. and that an unwanted abrupt changeover to diagnostic function is prevented absolutely.

What is claimed is:

1. In a motor vehicle having
    at least one network device (10, 18) and a microcomputer (11, 12, 13), including a working memory (13) and an error indication output means (26, 29), said microcomputer controlling said network devices (10, 18), and a plurality of transducer input terminals (19–26, 32–38) applying signals to said microcomputer, a method, for producing error indication signals, which can be indicated on simple and inexpensive signal indication devices, from said microcomputer-controlled network devices (10, 18), which, in accordance with applied transducer signals, execute specified functions (60), and, upon detecting (62) an error, store (63) a corresponding data word in memory (13), comprising the steps of:

manually actuating at least one switch (43,44) which causes a predefined abnormal condition on at least one of said transducer input terminals (19–26, 32–38);

converting, in response to said abnormal condition, the data word into at least one electrical signal pulse (70,75) on said error indication output means (26, 29), and detecting said pulse by measuring (47) at least one of the current and voltage.

2. A method as defined by claim 1, characterized in that a short diagnosis program (61) is provided in the program pass of the network device (10).

3. A method as defined by claim 1, wherein
an instruction in said microcomputer actuates the conversion of the data word into said at least one signal pulse and is defined as an ALTER command.

4. A method as defined by claim 3, characterized in that upon the absence of an error data word (69), a full diagnosis takes place (72).

5. A method as defined by claim 3, wherein
the ALTER command is triggered by short-circuiting at least one transducer signal line.

6. A method as defined by claim 5, characterized in that one of the ALTER commands is a transducer signal which is absolutely necessary for the functioning of the system, in particular the engine speed signal (n).

7. A method as defined by claim 6, characterized in that if the absolutely necessary transducer signal is absent and in the presence of stored information that starting of the drive assembly had first taken place, an error data word characterizing a defective transducer for this transducer signal is stored in memory (83).

8. A method as defined by claim 5, characterized in that the definite specifications of two transducer signals which are generatable by the actuation of existing switching devices and which during normal operation cannot occur simultaneously generates the ALTER command.

9. A method as defined by claim 8, characterized in that the definite specification comprises a definable sequence of these transducer signals ($S_1$, $S_v$).

10. A method as defined by claim 8, characterized in that the definite specification comprises a combination of transducer signals which cannot occur during normal operation ($S_1 = 1$ and $S_v = 1$).

11. A method as defined by claim 5 characterized in that the definite specification must take place, at least in part, with the engine shut off and/or in operation.

12. An apparatus as defined by claim 11, characterized in that one input is the engine speed transducer input.

13. An apparatus as defined by claim 11, characterized in that a voltmeter (47) or ammeter can be or is connected to the diagnosis insert-plug (42).

14. A method as defined claim 1, characterized in that after diagnosis has been completed and an error data word has been absent, a program (76) for monitoring electrical devices, in particular network output stages and positioning elements, controlled by the network device is started.

15. A method as defined by claim 14, characterized in that upon a specified transducer actuation on the part of the network device (10), a specified test signal train (78 or 80) is generated in a device controlled by the network device (10).

16. A method as defined claim 1, characterized in that after diagnosis has been completed and an error data word has been absent, an error indication is effected which characterizes the non-detection of an error (75).

17. An apparatus for performing the method as defined by claim 1, characterized in that one of the outputs of the network device (10) is connected with a voltage measuring device (47) or current measuring device in the motor vehicle, which device in the case of diagnosis indicates the diagnostic values and in the case of normal operation indicates a normal function.

18. An apparatus as defined by claim 17, characterized in that a control lamp (29) is provided for indicating a stored error data word.

19. In a motor vehicle having at least one network device (10, 18) and a microcomputer (11, 12, 13), including a working memory (13) and an error indication output means (26, 29), said microcomputer controlling said network devices (10, 18), and a plurality of transducer input terminals (19–26, 32–38) applying signals to said microcomputer, an apparatus for producing error indication signals, which can be indicated on simple and inexpensive signal indication devices, from said microcomputer-controlled network devices (10, 18), comprising
a diagnosis insert-plug (42) connected to the inputs (19–26) of the network device (10) and having a switch (43,44) for short-circuiting at least one input (19) to cause said microcomputer to generate at least one of an error indication command and a full-diagnosis command.

20. An apparatus as defined by claim 19, characterized in that for the diagnosis of a plurality of network devices (10), a single diagnosis insert plug (42), adapted to every network device, is provided.

21. An apparatus as defined by claim 19, characterized in that a control lamp (29) is provided for indicating a stored error data word.

22. An apparatus as defined by claim 21, characterized in that a switch (45) is provided for switching the output for the control lamp (29) over to a measuring-device connection (46).

23. An apparatus as defined by claim 22, characterized in that the switch (45) for the switchover is mechanically connected with the switch (43, 44) for the short-circuiting.

* * * * *